(12) United States Patent
Everett et al.

(10) Patent No.: US 8,300,528 B2
(45) Date of Patent: Oct. 30, 2012

(54) METHOD AND APPARATUS FOR COMMUNICATING DATA OVER A DATA NETWORK INCLUDING CONTROLLING BANDWIDTH OVER A DSL LINE

(75) Inventors: Philip Everett, Ipswich (GB); Trevor Linney, Stowmarket (GB); Gary Dalby, Ipswich (GB); Christopher M. Croot, Bury St. Edmunds (GB); Ashley Pickering, Ipswich (GB)

(73) Assignee: British Telecommunications public limited company, London (GB)

( * ) Notice: Subject to any disclaimer, the term of this patent is extended or adjusted under 35 U.S.C. 154(b) by 164 days.

(21) Appl. No.: 12/668,942

(22) PCT Filed: Jul. 11, 2008

(86) PCT No.: PCT/GB2008/002388
§ 371 (c)(1),
(2), (4) Date: Jan. 13, 2010

(87) PCT Pub. No.: WO2009/010726
PCT Pub. Date: Jan. 22, 2009

(65) Prior Publication Data
US 2010/0183062 A1 Jul. 22, 2010

(30) Foreign Application Priority Data

Jul. 13, 2007 (GB) .................................. 0713659.1
Feb. 25, 2008 (EP) .................................... 08250637

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/232; 370/235; 370/253; 370/352; 370/353; 370/354; 370/355; 370/356; 370/465; 370/468

(58) Field of Classification Search .................. 370/232, 370/235, 253, 465, 468, 352–356
See application file for complete search history.

(56) References Cited

U.S. PATENT DOCUMENTS
6,389,065 B1 * 5/2002 McGhee ....................... 375/222
(Continued)

FOREIGN PATENT DOCUMENTS
EP 1 748 671 1/2007
(Continued)

OTHER PUBLICATIONS
Anschutz et al., "DSL Evolution—Architecture Requirements for the Support of QOS-Enabled IP Services", Internet Citation, [Online], XP002364004, Retrieved from the Internet: <URL:http.//www.dslforum.org/techwork/tr/TR-059.pdf>.
International Search Report for PCT/GB2008/002388 mailed Nov. 6, 2008.

Primary Examiner — Michael Thier
Assistant Examiner — Benjamin H Elliott, IV
(74) Attorney, Agent, or Firm — Nixon & Vanderhye P.C.

(57) ABSTRACT

Providing an interface device interfacing between an access network and a back-bone network comprises: providing a management device, receiving data readings from a transceiver device indicative of the current or recent line rate of a DSL connection of the access network, and providing the interface device to restrict data flowing to the DSL connection to a new maximum rate selected in accordance with the received data readings from the transceiver device indicative of the current or recent line rate of the DSL connection. When the new maximum rate is greater than the existing maximum rate for the DSL connection at which the interface device is currently provided, the interface device is provisioned (or re-provisioned) only after a delay period. The delay period depends upon the increase amount of in the new maximum rate compared to the existing maximum rate so that the greater the increase, the shorter the delay period.

15 Claims, 6 Drawing Sheets

U.S. PATENT DOCUMENTS

| | | | | |
|---|---|---|---|---|
| 7,457,993 | B2* | 11/2008 | Modlin | 714/701 |
| 7,706,287 | B2* | 4/2010 | Tanaka | 370/241 |
| 8,009,665 | B2* | 8/2011 | Cioffi et al. | 370/352 |
| 2005/0174938 | A1* | 8/2005 | Richardson et al. | 370/230.1 |
| 2006/0274668 | A1* | 12/2006 | Franklin et al. | 370/252 |
| 2010/0183062 | A1* | 7/2010 | Everett et al. | 375/222 |

FOREIGN PATENT DOCUMENTS

| | | | |
|---|---|---|---|
| EP | 1748671 A1 * | 1/2007 | |
| WO | WO 2007/012867 | 2/2007 | |
| WO | WO 2007012867 A1 * | 2/2007 | |

* cited by examiner

METHOD AND APPARATUS FOR COMMUNICATING DATA OVER A DATA NETWORK INCLUDING CONTROLLING BANDWIDTH OVER A DSL LINE

This application is the U.S. national phase of International Application No. PCT/GB2008/002388 filed 11 Jul. 2008 which designated the U.S. and claims priority to GB Application No. 0713659.1 filed 13 Jul. 2007 and EP Application No. 08250637.9 filed 25 Feb. 2008, the entire contents of each of which are hereby incorporated by reference.

FIELD OF THE INVENTION

The present invention relates to a method and apparatus for communicating data over a data network. In particular, it relates to controlling the bandwidth with which a user can transmit or receive data over a Digital Subscriber Line (DSL) connection (especially an Asynchronous Digital Subscriber Line (ADSL) connection and an access network to the user's Internet Service Provider (ISP).

BACKGROUND TO THE INVENTION

ITU recommendation G992.1 specifies how the maximum bandwidth which can be supported over a particular ADSL connection between a particular Remote ADSL Transceiver Unit (ATU-R) and a particular Central office or network operator ADSL Transceiver Unit (ATU-C) may be determined at the time of initiation of the ADSL connection (see G992.1 Chapter 10) and may even be periodically re-negotiated during a connection (see G992.1 Appendix II); the maximum bandwidth in fact depends upon various factors which will differ from line to line and from time to time depending on things such as the amount of electromagnetic noise present in the environment of the ATU-R, etc.

However, despite this, it is common in most practical implementations of ADSL for a network operator to offer an end user a fixed bandwidth (commonly offered values being 500 kb (kilo bits/second, 1 Mb (Mega bits/second) and 2 Mb). In such circumstances, the initiation process happens in the standard way to establish the maximum bandwidth available over the connection, but instead of then setting up the connection at that maximum setting, it is simply checked whether or not this maximum is at least equal to the contractually agreed bandwidth, and if so, then the connection is made at this agreed amount (rather than the maximum available) but otherwise the connection is just not made at all.

For IP connections passing through the Access Network via an ADSL connection to an Internet Service Provider (and thus via a Point Of Presence (POP) to the Internet), in a typical currently extant access network, there are two aggregation points. One occurs at the Digital Subscriber Line Access Multiplexer (DSLAM) (discussed above) and the other occurs at a device known as the Broadband Remote Access Server (BRAS—pronounced "Bee Raz"). The BRAS is an interface device between the IP network which connects to Internet Service Providers (ISP's) and the access network to which end users are connected. The BRAS performs numerous functions including policing the amount of data flowing from ISPs through the BRAS and on through the access network towards the DSLAM. In this capacity, it ensures that the rate at which each ISP sends data to any given end user complies with a profile which is stored in respect of each end user and includes the maximum rate at which the end user is able to receive data (which is determined by the contractually agreed connection rate, e.g. 1 Mb). Any data sent in excess of the maximum permitted rate specified in the user's profile is thrown away by the BRAS. This, in turn, causes the sending source to throttle back its rate of transmission (by the normal operation of the Transport Control Protocol (TCP)) until it approaches the maximum rate permitted by the BRAS.

In addition, each ISP has a maximum permitted aggregated rate at which it may send data to all of its customers at any one time, through any particular BRAS. Usually an ISP will purchase sufficient capacity to maintain a predetermined number of its end users at full capacity at any one time, which predetermined number will typically represent only a small fraction of the total number of customers to which it is connected via the respective BRAS, since only a small number of users is expected to be downloading data simultaneously via a single BRAS at any one time. If too many customers are on-line and downloading data at any one time, the BRAS will reduce the amount of data sent to each user proportionately in order to bring the total amount of data transported down to a rate which satisfies the agreement between the access network operator and the ISP.

The various profiles and other settings on a BRAS may be changed by the network operator responsible for the BRAS—making such a change is referred to as provisioning (or re-provisioning) the BRAS and this is discussed in greater detail below.

It would be desirable to provide a system in which, instead of setting up an ADSL connection at a prearranged bandwidth or not at all, the connection is set up at the maximum bandwidth which the connection can establish. Naturally, in order to permit the full rate of data to be transmitted over the ADSL connection, it is necessary that the respective BRAS also permits at least that rate of data for that connection to be passed through the BRAS onto the access network.

The present applicant is aware of three previously proposed approaches for achieving this in cases where the ADSL connection bandwidth is not constrained to take on only a single value. One approach, which it is believed is currently in operation in New Zealand, is to not limit the amount of data which can pass through the BRAS in respect of any one connection, but simply to enforce that data from a single ISP may not exceed a certain amount. The end user (and/or the end user's machine on behalf of the end user) may negotiate with his/her ISP after the ADSL connection has been set up such that the ISP may allow data to pass into the access network at a rate which matches that which the ADSL connection can support. Alternatively data is sent at a rate settled by the TCP protocol (i.e. if a source is sending data too quickly—for whatever reason—packets will be lost until a rate is arrived at which ceases to cause packet loss). This approach should work reasonably well on networks which are not heavily used, but in more congested networks it is very inefficient.

An alternative proposed approach is that hinted at in the DSL Forum's Technical Report No. TR-059. In this report it suggests that the "BRAS MUST be provisioned so that it does not allow traffic to flow faster than the DSL "sync" rate [which is the maximum rate which the ADSL connection can support as determined by the ATU's at the time of setting up the connection]. The BRAS MAY be provisioned with the actual DSL sync rate to accomplish this."—see section 4.2.5.4 of TR-059 (which is on Page 21 of Version 10 of TR-059). Naturally, since TR-059 is a list of requirements rather than a description of a working system, it does not specify how this could be achieved. However, it seems to teach in the direction of communicating with the BRAS about each ADSL connection, at least every time such a connection is set up. However this solution would place a very heavy signalling burden on the access network and on each BRAS, given the current infrastructure in a typical access network for communicating with BRAS's.

Furthermore, the present applicant has recently proposed a mechanism for provisioning the BRAS in such a way that the BRAS profile for each end user is set to a consistently achievable rate as described in published International Patent Application Number WO 2007/012869 A1. However, the inventors have discovered that this approach can lead to frustration on the part of users when they witness a significant improvement in the rate at which their ADSL connection syncs up without a corresponding increase in the rate at which they can download data (owing to the delay in their corresponding BRAS profile being increased in line with the increased sync rate of their ADSL line).

SUMMARY OF THE INVENTION

According to a first aspect of the present invention, there is provided a method of provisioning an interface device, the interface device interfacing between an access network and a back-bone network, the access network including a Digital Subscriber Line, DSL, connection to an end user terminal and a transceiver device including a DSL transceiver for modulating and demodulating signals sent to and from the end user terminal over the DSL connection, the arrangement of the network apparatus being such that data from a device connected to the back-bone network which is destined for the end user terminal passes through the interface device and then through the access network and wherein the interface device is operable to constrain the rate of flow of data from the backbone network through the interface device towards the end user terminal to a predetermined maximum rate specified for the end user terminal, the method comprising:

providing a management device for managing the interface device;

receiving data readings from the transceiver device indicative of the current or recent line rate of the DSL connection; and provisioning the interface device to restrict data flowing to the DSL connection to a new maximum rate selected by the management device in accordance with the received data readings from the transceiver device indicative of the current or recent line rate of the DSL connection, wherein, when the new maximum rate is greater than the existing maximum rate for the DSL connection at which the interface device is currently provisioned, the interface device is provisioned (or re-provisioned) only after a delay period, and wherein the delay period depends upon the amount of the increase in the new maximum rate compared to the existing maximum rate, and wherein, the greater the increase, the shorter the delay period.

Preferably, the delay period is determined as commencing either at the last time at which the interface device was provisioned (or re-provisioned) in respect of the DSL connection or at the time of receipt of a data reading indicating that the line rate of the DSL connection has increased sufficiently to justify a re-provisioning of the interface device.

Preferably, if the new maximum rate for which the interlace device is to be provisioned is less than the currently provisioned rate, then the interface device is re-provisioned as soon as possible, regardless of the percentage size of the change.

Preferably, if the DSL connection is determined as having been re-provisioned more than a predetermined number of times (e.g. 5 times) within a given period (e.g. of 24 hours), then the DSL connection is determined as being a swinging connection and swinging connections are subjected to a minimum delay period for swinging connections before the device is re-provisioned to increase the maximum data rate permitted through the interface device towards the end user, even in the event that the new maximum rate is considerably greater than the existing maximum rate (e.g. such that if it were not a swinging connection it would be re-provisioned much more quickly).

Preferably the transceiver device is a Digital Subscriber Line Access Multiplexer (DSLAM) and the interface device is a Broadband Remote Access Server (BRAS).

Preferably, the length of the delay period depends upon the percentage increase of the new maximum rate compared to the current maximum rate at which the interface device is currently provisioned (for the DSL connection).

According to a second aspect of the present invention, there is provided a management device for assisting the making of broadband data connections to end users each via an end user DSL modem, a local loop, a Digital Subscriber Line Access Multiplexer, DSLAM, an access network, a Broadband Remote Access Server, BRAS, and an onward connection to a service provider which may have a Point Of Presence on the Internet Backbone, the device including a DSLAM interface for receiving messages from the or each DSLAM and a BRAS interface for transmitting messages to the or each BRAS, a data store for storing data in respect of each connection with which it is associated and a processor unit for processing messages received from the or each DSLAM in combination with data stored in the data store to generate control messages for sending to the or each BRAS, wherein when a message received from a DSLAM indicates that a new control message should be sent to the BRAS in order to re-provision the BRAS to allow data through it at a new increased maximum rate corresponding to a new increased data rate indicated in the message received from a DSLAM for a particular Digital Subscriber Line, the processor unit determines a delay period which depends upon the percentage increase of the new maximum rate compared to the existing maximum rate for the line at which the BRAS is currently provisioned, wherein the greater the percentage increase, the shorter the delay period, and upon or after expiry of this delay period the management device is operable to generate and send the new control message corresponding to the most recently received message from the DSLAM.

Preferably the management device is operable to generate and send a new control message to the BRAS with the minimum possible delay if the new maximum rate to which the BRAS is to be provisioned is less than that at which it is currently provisioned for a particular DSL connection.

Note that in practice the DSLAM may report a gross maximum attainable rate which includes the bandwidth required for signalling purposes. However, reference to the maximum attainable rate in the present specification means the net maximum attainable rate at which user data may be transmitted (i.e. the gross maximum attainable rate minus that portion required for signalling). Calculation of the amount of bandwidth required for signalling may conveniently be performed by the management device or alternatively it may be performed by the BRAS.

By specifying a variable delay before re-provisioning the interface device (the BRAS) to increase the amount of data which it allows through to the end user, the number of messages that need to be sent to the BRAS can be dramatically reduced (compared to a case where there is a minimal delay in such re-provisioning) whilst still maintaining a good service to each end user, and in particular, it allows the end user to experience an increase in data throughput where there has been a significant increase in the line sync rate with only a relatively short delay.

Preferably the data readings are sent automatically to the management device by the transceiver device, or an intermediate transceiver device managing device, to the management device, either periodically, or in response to a sync/re-sync event on the DSL connection.

Preferably the interface device is re-configured shortly after detecting that the DSL connection line rate has dropped to a new profile, but is re-configured to a new higher profile only after a longer delay to ensure that the increase is sustained for a minimum period. Each profile of the interface device corresponds to a range of different corresponding line rates of the DSL connection.

Further aspects of the invention include processor implementable instructions for causing a processor controlled device to carry out the method of the first aspect of the present invention and carrier means, preferably tangible carrier means such as an optical or magnetic storage disk (e.g. a CD or DVD) or non-volatile solid state memory (e.g. a usb memory stick) carrying such processor implementable instructions.

BRIEF DESCRIPTION OF THE FIGURES

In order that the present invention may be better understood, embodiments thereof will now be described, by way of example only, with reference to the accompanying drawings in which:

FIG. 5 is a flow diagram of further steps carried out by the management device in order to detect DSL connections which are demonstrating instability in terms of the rate at which they are syncing up at.

DETAILED DESCRIPTION OF EMBODIMENTS

Main Embodiment

Figure 1:
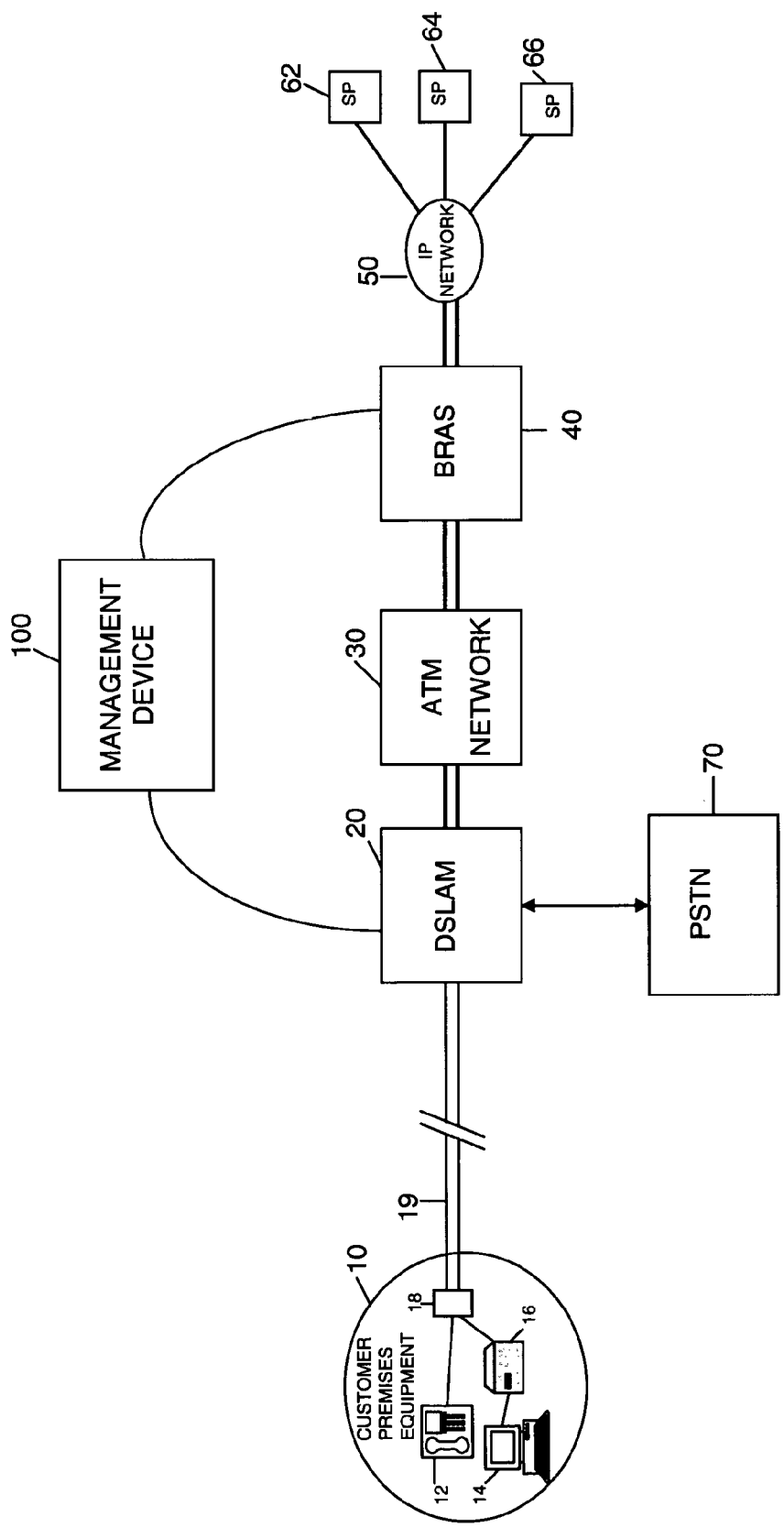
FIG. 1 is a schematic block diagram illustrating a telecommunications network incorporating a management device according to a first aspect of the present invention.

Referring to FIG. 1, a first embodiment of the present invention is illustrated in overview. A copper pair loop 19 (which forms part of the access network which extends between customer premises equipment 10 and the BRAS 40) connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet travelling from computer 14 towards an ISP 62, 64, 66 would be the BRAS 40; whereas in other cases the first hop from an IP perspective could be beyond the BRAS 40.

In all cases, the end user's modem 16 creates a Point-to-Point Protocol (PPP) session 30 from the modem to another device in the network. This is a logical end to end connection that carries the end users traffic from the modem to the target IP network.

In some cases (e.g. in BT's Central+ product), the PPP session is terminated on the BRAS, and then onward routed directly onto the Internet (e.g. via a core IP network such as BT's Colossus network).

In one example configuration where the PPP session is not terminated at the BRAS 40, the PPP session is terminated on a "home gateway" at the edge of the core network, connected to the Service Provider (SP). In another example configuration (e.g. such as in the BT central product) a Layer 2 Tunnelling Protocol (L2TP) tunnel is used to pass through the BRAS 40 to a terminating BRAS which belongs to the SP; the L2TP tunnel tunnels all the PPP sessions into the SP network for them to handle as they want.

In all cases, the first IP hop is from the end user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (where the BRAS 40 terminates a PPP connection from the customer premises equipment 10) or at a lower level (e.g. at the ATM layer) where there is some sort of sub-IP layer tunneling through the BRAS 40.

The above mentioned arrangement of items 10, 19, 20, 30, 40, 50, 62, 64, 66 and 70 is conventional. However, in addition to this conventional arrangement, in the present embodiment there is a management device 100 which communicates between the DSLAM 20 and the BRAS 40. The detailed operation of this device is explained in greater detail below with reference to FIGS. 2, 3, 4 and 5. However, in overview it obtains information from the DSLAM 20 about the rate at which each Digital Subscriber Line (DSL) connects to the DSLAM (in the present embodiment this is done by the DSLAM which automatically transmits messages to the management device (possibly via one or more intermediary devices) whenever a DSL syncs up at a new rate (or on a daily basis if there have been no recent sync events for a particular DSL); each such message contains two related items of data in respect of the DSL: the Actual Line Rate and the Maximum Achievable Line Rate—these are discussed in greater detail below).

The management device then processes this received line rate information to determine if the profile for the respective DSL needs to be changed. If the received line rate information indicates that the BRAS profile should be lowered (because the line rate has reduced since the BRAS profile was last provisioned) it instructs the BRAS to re-provision the profile for the DSL as soon as possible; however, if the received line rate information indicates that the BRAS profile should be increased (because the line rate has increased since the BRAS profile was last provisioned) it instructs the BRAS to re-provision the profile for the DSL to allow higher through flows of traffic through for that DSL only after a specified delay, which delay depends upon the percentage increase in the rate at which data is to be allowed through the BRAS, such that the greater the absolute or percentage increase, the shorter the delay.

The exact algorithm used by the management device in the present embodiment to calculate the appropriate delay before increasing the profile (for a particular DSL) in the BRAS in the present embodiment is described below. However, it should be noted that the intention of the algorithm is to arrange that the user will receive data at the highest rate which his/her DSL is able to obtain without requiring the BRAS to be reconfigured every time the DSL is connected in the case of DSL's which are frequently re-syncing. At the same time the algorithm seeks to ensure that if the DSL connects at a rate which is below that at which the BRAS is currently configured to allow data through, then the BRAS is quickly reconfigured to avoid overloading the DSLAM. The reason for wanting to avoid having to contact the BRAS on a very frequent basis is that with current systems it is not generally possible to reconfigure the BRAS without a significant delay (e.g. of a few minutes). Furthermore, there is a limit to the rate at which a BRAS can process reconfiguration requests. These restrictions are sometimes referred to by saying that the BRAS needs to be provisioned, and drawing a distinction between systems which are switched (e.g. ATM Switched Virtual Circuits) and systems which are provisioned. Current systems allow for quite quick provisioning (often a matter of minutes rather than days or weeks) but there is still a significant difference between such quick provisioning and realtime switching.

Figure 2:
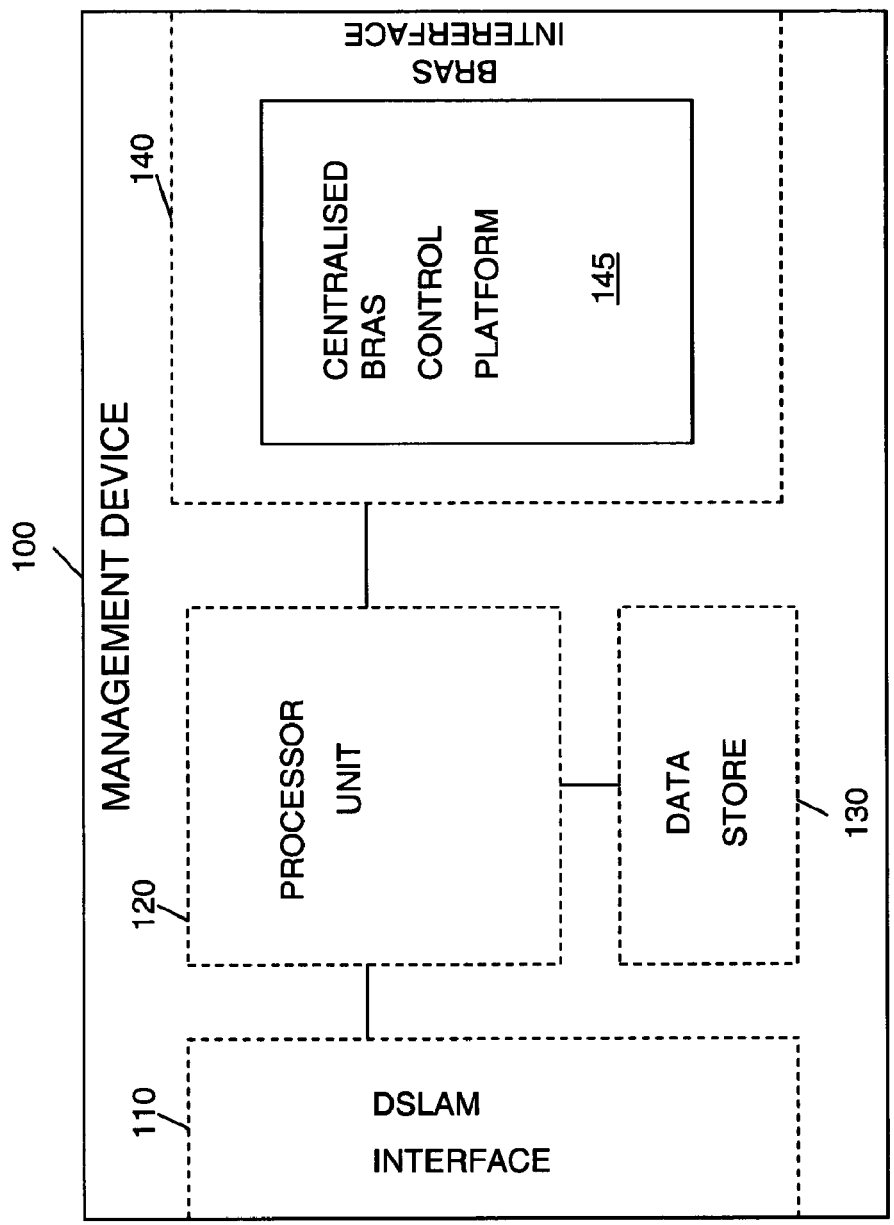
FIG. 2 is a schematic block diagram illustrating the management device of FIG. 1 in more detail.

Referring now to FIG. 2, the management device 100 of the present embodiment comprises a DSLAM interface 110, a processor unit 120 a data store 130 and a BRAS interface 140. In the present embodiment, the BRAS interface 140 includes a centralised BRAS control platform 145 such as that currently found in many broadband access networks and conventionally used to provision the BRAS in accordance with a particular profile as agreed between a Service Provider and its customer (to whom the ADSL service is being provided). As mentioned above, this is conventionally done on a very static basis (e.g. a customer purchases a 1 Mbps ADSL service and the BRAS is configured to allow a corresponding rate of data through to the DSL in question). In the present embodiment the pre-existing centralised BRAS control platform is used as the BRAS control platform 145 forming part of the BRAS interface 140 and it is therefore physically separate from the rest of the management device 100 however this need not be the case in other embodiments.

The data store 130 maintains in respect of each DSL which it is managing (note that it is anticipated that a single management device 100 will cover an entire country- or region-wide broadband access network and may therefore be managing up to several million such lines) an indication of the current BRAS profile rate for that line, historical information about the data retrieved from the DSLAM during preceding polls (explained in greater detail below) and physical data about the DSL such as the DSLAM to which it is connected (and the port on the DSLAM to which it is connected) and the BRAS 40 through which it is connected to the IP Network 50.

In the present embodiment the Management device (apart from the BRAS control platform 145) is implemented on a single server computer. However in alternative embodiments in which many millions of lines may need to be managed the management device 100 may be implemented on plural distributed server computers and the data store 130 may be provided by a separate data warehousing function, etc.

In the present embodiment, the information about the line rate at which the end users modem/router 16 syncs up with the DSLAM 20 is delivered to the management device 100 via two methods. The first method is event based from the DSLAM 20 (or an element manager thereof if used as an intermediate device aggregating the data from a number of DSLAM's rather than having each DSLAM communicate directly to the management device) and the second is a daily 'Heartbeat' feed from a separate (at least functionally—in practice this separate function might be performed by the same hardware) management device performing Dynamic Line Management (DLM) control of the profiles stored in the DSLAM in respect of each line. The DLM profiles set values for various parameters which are used in setting up an ADSL connection, such as, for example, depth of interleave, etc. as is well known to a person skilled in the art.

In the present specification, the management device 100 and its function in controlling BRAS profiles may hereinafter be referred to as a MAX instance in order to distinguish from the separate DLM management function controlling profiles in the DSLAM 20 (which may be referred to as a DLM manager or DLM instance).

The event based feed will occur whenever the end user modem 16 syncs up with the DSLAM 20 and causes the data will be passed to the MAX Instance 100 directly from the DSLAM 20 (or by the element managers when present).

This sync event is then analysed within the MAX Instance to determine if a BRAS profile change is required as described below.

As mentioned above, the alternative method by which line rate information can be delivered to the MAX Instance is by a daily heartbeat feed from the DLM Instance. The Heartbeat method ensures that at least on a daily basis a single line rate will be sent from the DLM Instance to the MAX Instance for each end user if they have been logged on at anytime during that day.

These are sent to the management device 100 to be loaded into the MAX database (data store 130) and analysed in the same way as the end user line rates received in the sync events (received either directly from the DSLAM 20 or the element manager thereof if present).

If the DLM Instance has received a number of different line rates for a particular line in a given day, the minimum speed for the day is selected by the DLM Instance and sent to the MAX Instance in the heartbeat message.

This feed is not to support people who are on routers and are connected constantly and therefore produce no sync events during the day as the logic is not dependant on daily sync events, but it is performed as a backup measure to ensure that all speed changes are captured even in a case where sync event messages are lost due to network or system issues.

In the present embodiment, an additional check is performed prior to sending a heartbeat message from the DLM Instance to the MAX Instance. The reason for this additional check is that if a heartbeat were generated for all lines on a daily basis regardless of whether or not a sync event has already been received by the MAX Instance on that day, then this could cause a problem as the heartbeat message could result in the MAX Instance logic setting a BRAS profile to a lower rate than that which is actually justified by the most recent rate at which the line has synced, and thus at a slower speed than it is actually capable of supporting.

Therefore, in the present embodiment, before a heartbeat is generated by DLM it checks whether a sync event has been received by the MAX Instance within a configurable period which in the present embodiment is set to 48 hours for that line. This check is made, in the present embodiment, by accessing the currently stored "sync timestamp" stored in respect of each line in the Data Store 130 of the management device 100.

Thus, in the present embodiment, if a sync event has been received within the last 48 hours by the management device 100 for the line, then no Heartbeat is generated that day by DLM; otherwise, a heartbeat message is generated by the DLM Instance and sent to MAX Instance.

Figure 3A:
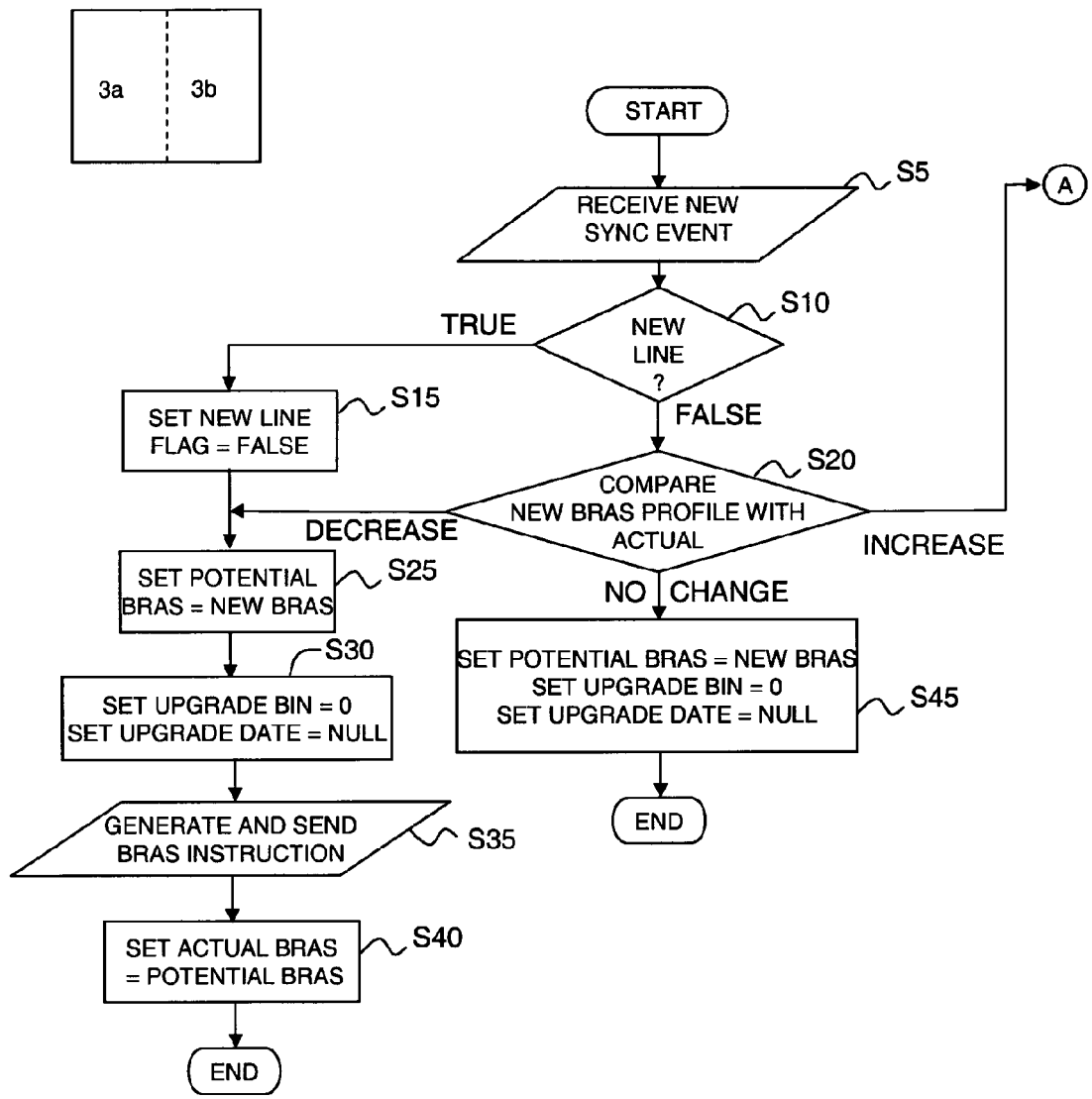
FIG. 3 is a flow diagram illustrating steps carried out by the management device of FIG. 2 to maintain the BRAS settings at appropriate values.
Figure 3B:
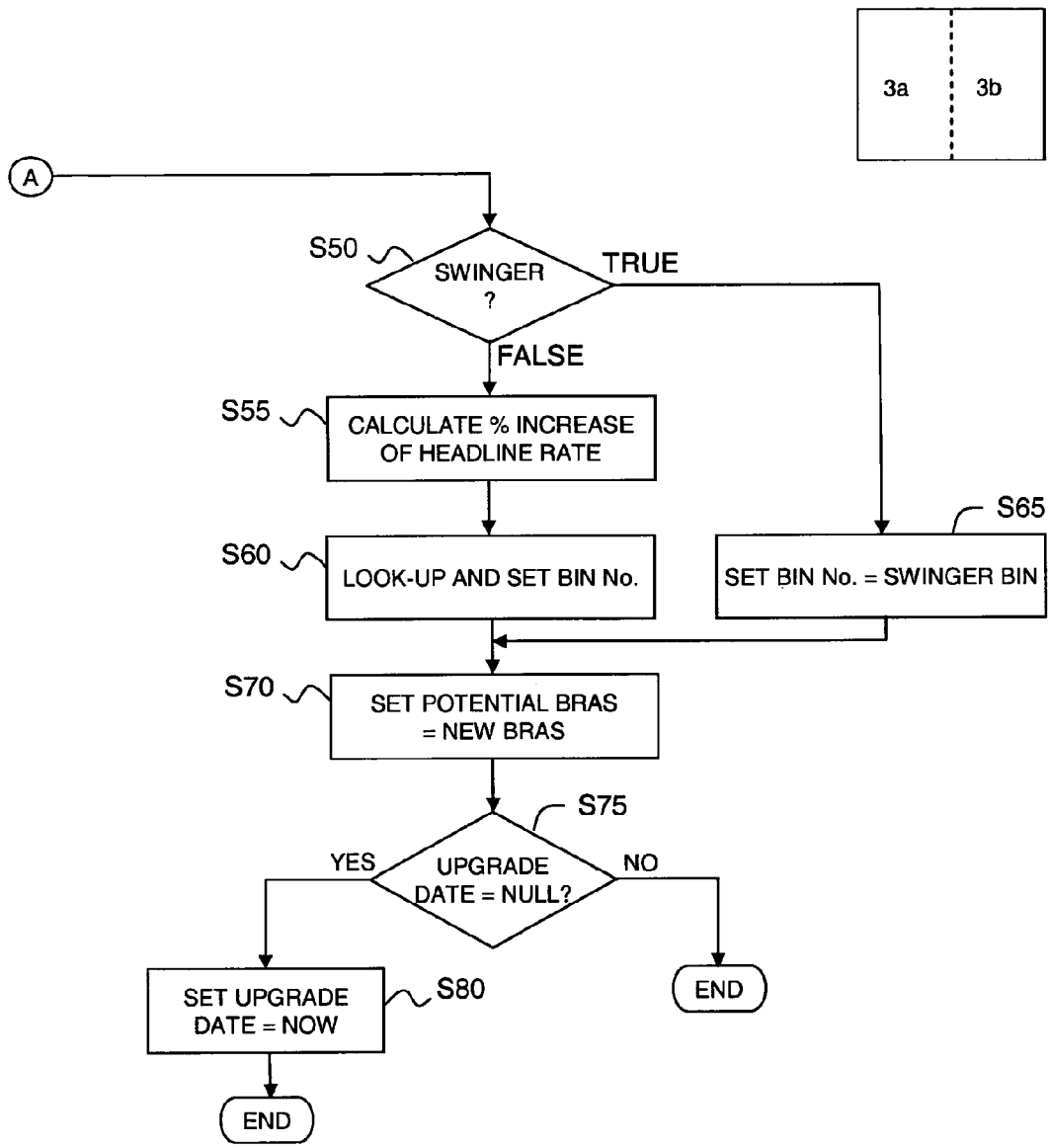
Figure 4:
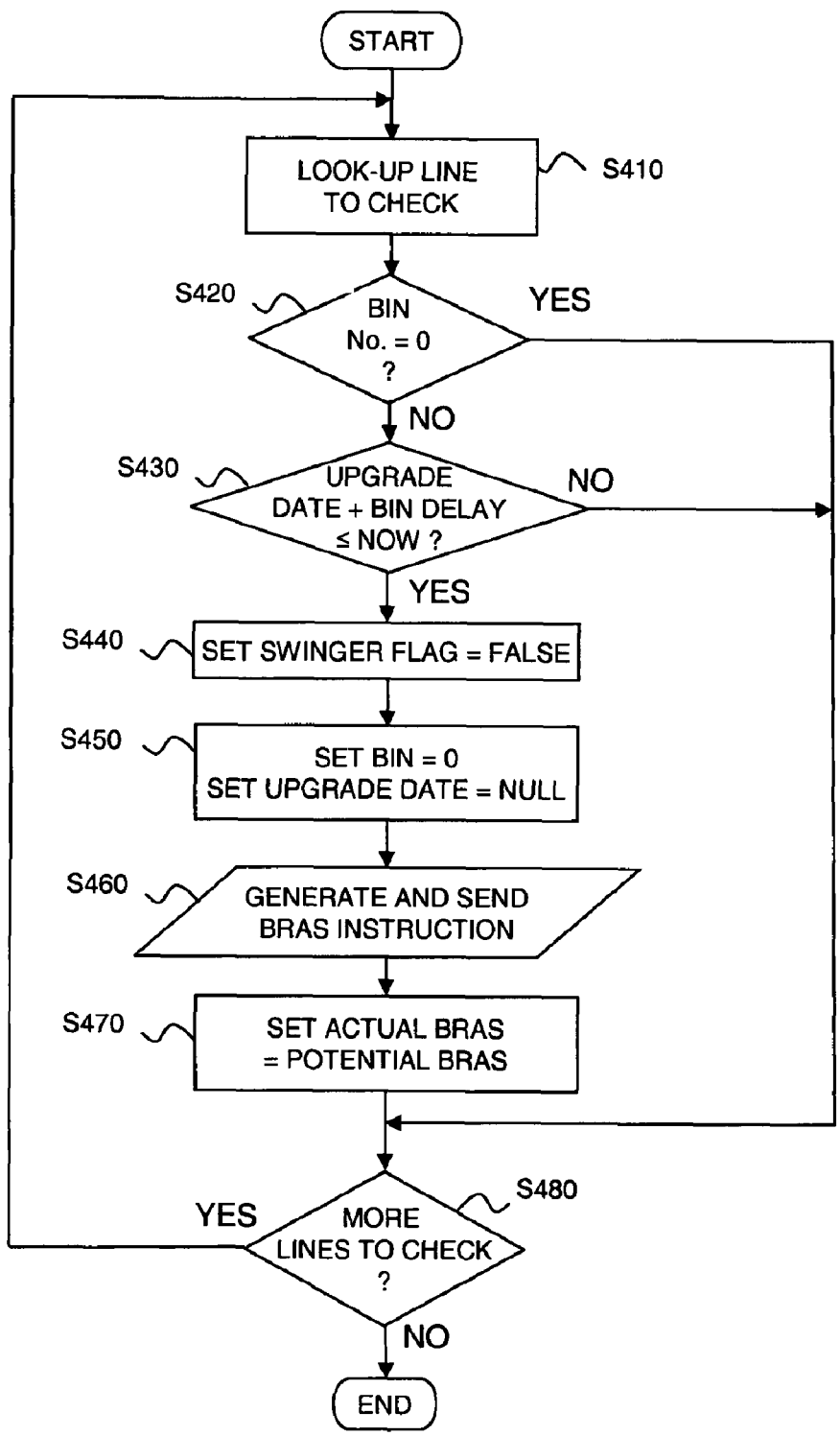
FIG. 4 is a flow diagram illustrating further steps carried out by the management device in order to periodically upgrade the profile of DSL connections after a specified delay has expired.
Figure 5:
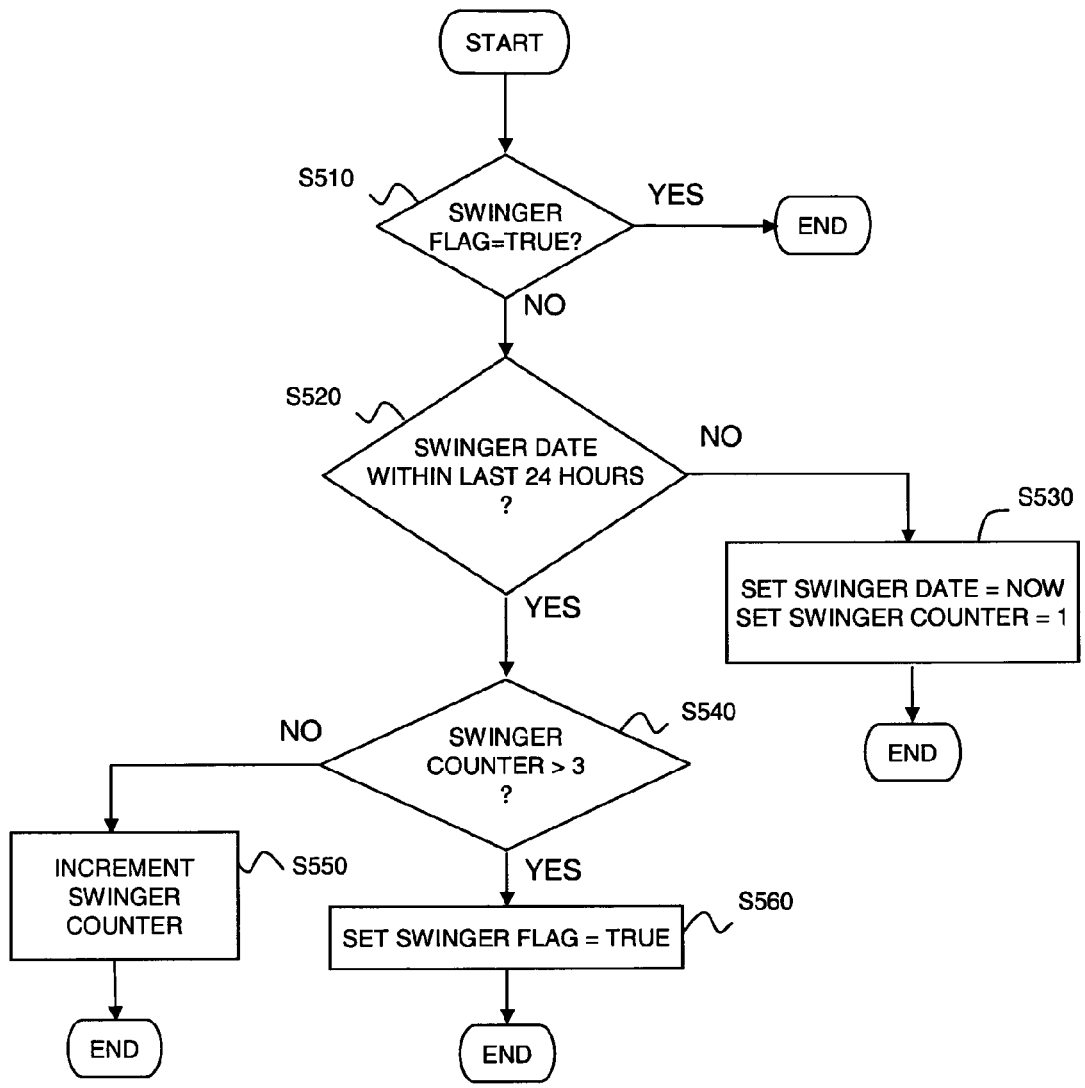

In the present embodiment, the management device stores in its data store 130 the following parameters in respect of each line which it is monitoring (the purpose of these parameters will in general become clear from the following description of the processes performed by the management device 100 and illustrated in FIGS. 3-5):

1. The Actual BRAS profile of the line (including the name of the profile (e.g. adsl500) and the headline rate of the profile (e.g. 500).
2. The Potential BRAS profile of the line (again including the name and headline rate of the profile).
3. A New BRAS Profile of the line (again including the name of the profile and its headline rate—the new BRAS Profile is overwritten with a new value every time a sync event or heartbeat message is received as described below with reference to step S5 of FIG.
4. A new line flag.
5. A sync timestamp. (this store the time when a sync event was last received for the respective line—note it does not store the time of receipt of a heartbeat message).
6. An actual Downstream Line rate (which in the present embodiment is generally the MALR reported by the DSLAM as discussed below).
7. An Upgrade Bin No. (there are several bin numbers (7 in the present embodiment) and each has an associated delay; this is discussed in greater detail below).
8. An Upgrade Bin Date (which is used together with the delay associated with the respective Bin No to determine when a line is due for an upgrade where applicable).
9. A swinger Flag (which identifies lines considered to be swinging excessively)
10. A Swinger counter (used in the process to identify lines considered to be swinging).
11. A Swinger Date (also used in the process to identify lines considered to be swinging).

The DSLAM 20 generally has available to it two different parameters which are indicative of downstream line rate, the Actual Line Rate (ALR) value and the Maximum Available Line Rate (MALR) value. The ALR value provides a reading of the actual line rate that the system has synchronised at. If the system has been configured to deliver a fixed bit rate connection to the end user then the ALR value should be equal to this configured rate. Note that generally, the ALR is only available if there happens to be an active connection in process between the respective CPE 10 and the corresponding DSLAM 20.

The MALR figure represents an estimate provided by the DSL system of the maximum possible line rate that is achievable under the current noise conditions. MALR is typically only calculated once during the start-up sequence of the DSL modems and then remains fixed throughout that session. The MALR is used in the present embodiment as an indication of line rate where possible because it is generally available even when there is no DSL connection active (in which case the ALR value is given as NULL).

As mentioned above, if the system has been configured to deliver a fixed bit rate connection to the end user then the ALR value is equal to this configured rate, whereas the MALR expresses the maximum rate which the line should be able to support. When the system is configured to run at the maximum possible rate (i.e. not constrained to any fixed rate as is the case for all lines of interest in the present invention) then the ALR value and MALR should in theory be the same. However, in practice there is often a small difference between the values since they are calculated slightly differently. Nonetheless, for these reasons, the MALR is generally the figure relied upon to obtain the actual downstream line rate which is stored in respect of each line by the data store 130 and also used to determine the New BRAS Profile whenever a new sync event message or Heartbeat message is received by the management device 100.

Referring now to FIG. 3, in overview, the method employed by the management device 100 checks, whenever a new sync event or heartbeat message is received, whether the BRAS profile should be decreased (because the line rate has gone down below a threshold amount), increased (because the line rate has gone up above a threshold amount) or should stay the same (because the new line rate is still within the bounds covered by the existing profile set at the BRAS for that line). Where the BRAS profile should be increased (i.e. a new BRAS profile should be set which has a higher headline rate) the method also determines an appropriate delay before an instruction should be sent to the BRAS to set a new higher rate profile for the line; the actual delay incurred before the instruction is sent depends on a number of factors, the most important of which, however, is the amount of the increase in headline rate of the new BRAS profile relative to the current BRASS profile. The method also allows new lines to be treated in a special manner so the BRAS is set straight away to the appropriate profile for the received line rate information.

The process illustrated in FIG. 3 thus commences at step S5 in which a new sync event (or heartbeat) message is received by the MAX instance (management device 100) and the corresponding BRAS profile is obtained from a lookup table (the lookup table specifies for each BRAS profile (e.g. adsl500, adsl1000, adsl2000, adsl8000) a range of values for the MALR which corresponds to the respective profiles (e.g. 580-1079 (kbs for adsl500), 1080-2079 (for adsl1000), 2080-3079, . . . , 8080-9079).

The process then moves to step S10 in which it is checked if the new line flag parameter for the line is set to TRUE (this is the initial setting for this parameter so until the process has been run at least once the new line flag will be TRUE, thereafter however it will always be FALSE). If it is determined at step S10 that the new line flag is TRUE, then the process proceeds to step S15 in which the new line flag is set to FALSE and then the process proceeds to step S25. If at step S10 it is determined that the new line flag is set to FALSE, then the method proceeds to step S20.

In step S20 the headline rate of the New BRAS Profile (which was looked up in step S5) is compared with the actual BRAS Profile headline rate. Depending upon the outcome of the determination, the process proceeds to one of steps S25 (if the headline rate has decreased—i.e. if the new headline rate is less than the actual (i.e. the current) headline rate), S45 (if the headline rate is unchanged) or to S50 (if the headline rate has increased—i.e. if the new headline rate is greater than the actual or current headline rate).

Thus, if it is determined at step S20 that the new headline rate has decreased, then the process proceeds to step S25 in which the Potential BRAS profile is set to equal the NEW BRAS Profile.

The process then proceeds to step S30 in which the Upgrade Bin No. (hereinafter Bin) is set to 0 and the Upgrade Date/Time parameter is set to NULL.

The process then proceeds to step S35 in which an instruction for the BRAS is generated and sent to the BRAS.

The process then proceeds to step S40 in which the parameter called the actual BRAS profile is set to equal the potential BRAS profile (thus in the present embodiment, the actual BRAS profile is set as soon as the instruction to the BRAS is sent; a more sophisticated variant of this is described below where the actual BRAS profile is updated by a separate function which monitors and controls the sending of instructions to the BRAS and the receipt of confirmations from the BRAS that a profile has been changed).

Upon completion of step s40 the process ends.

If at step S20 it is determined that the headline rate has not changed, the process proceeds to step S45 in which the potential BRAS is set to the New Bras obtained in step S5, the Bin is set to 0 and the Upgrade Date/Time parameter is set to Null.

Upon completion of step S45 the process then ends.

If at step S20 it is determined that the headline rate has increased, then the process proceeds to step S50 in which it is determined whether the Swinger flag is set to TRUE or FALSE. If the Swinger flag is set to FALSE, the process proceeds to step S55 in which the percentage increase of the headline rate is calculated (according to the formula ((New BRAS Headline Rate−Actual BRAS Headline Rate)/Actual BRAS Headline Rate)*100). The process then proceeds to step S60 in which the percentage increase is used to look up the corresponding Bin in a Bin Table—the Bin table used in the present embodiment is set out below in Table 1. Having determined the Bin in this way, the process proceeds to step S70. If at step S50 it is determined that the Swinger flag is set to TRUE, the process proceeds to step S65 in which the Bin is set to the default swinger bin (which in the present embodiment is Bin 3—see Table 1 below). Upon completion of step S65, the process proceeds to step S70.

TABLE 1

Example Bin table

| Bin Number | % Change Min | % Change Max | Home Delay (Hours) | Office Delay (Hours) |
| --- | --- | --- | --- | --- |
| 1 | >0% | 10% | 120 | 120 |
| 2 | >10% | 19% | 96 | 96 |
| 3* | >19% | 50% | 72 | 72 |
| 4 | >50% | 99% | 48 | 48 |
| 5 | >99% | 299% | 24 | 24 |
| 6 | >299% | 999% | 12 | 12 |
| 7 | >999% | N/A | 4 | 4 |

Note that this table allows for different delays to be set for business users (Office) and home users (Home) though in the present embodiment these actually have the same delays, it is easy to change this if desirable. The asterisk in Bin 3 indicates that this is the default Bin for Swinger lines.

At step S70, the potential BRAS profile is set to equal the new BRAS profile obtained in step S5.

The process then proceeds to step S75 in which it is determined if the Upgrade Date/Time is set to Null. If it is not, then the process ends, otherwise the Upgrade Date/Time is set to the current date and time and then the process ends.

In the present embodiment, a sub process is run on a periodical basis (every hour in the present embodiment) whose steps are illustrated in FIG. 4. In overview, this process checks every line looking for lines which are due to be upgraded (i.e. where the profile is due to be increased and which have waited sufficiently long in view of their calculated delay).

Thus at step S410 a line, requiring checking is looked up and, at step S420 it is determined if the Bin is equal to 0 (lines whose Bin=0 are not due to be upgraded at all so these can be skipped); thus, if it is equal to 0, the process jumps to step S480, otherwise the process proceeds to step S430 in which it is determined if the Upgrade Date/Time+the Upgrade Bin Delay time (which is looked up in the Bin table based on the stored Bin for the line) is calculated and compared with the current date/time. If the sum is less than or equal to the current time it implies that the line is now due to be upgraded and the process proceeds to step S440, otherwise the line is not yet due to be upgraded and so the process jumps to step S480 to see if there are further lines to be checked.

At step S440 the Swinger flag is set to FALSE (this is done in the present embodiment to ensure that lines which have been determined as Swingers are not always thereafter considered to be swingers; at this point in time, the line will have had to wait at least the default period for swingers (i.e. 72 hours in the present example—see Table 1) before being upgraded so it is a reasonable time to give the line a new chance to demonstrate that it is no longer swinging).

Upon completion of step S440 the process proceeds to step S450 in which the Bin is reset to 0 and the Upgrade date for the respective line is reset to Null. The process then proceeds to step S460 in which a BRAS instruction is generated and sent to the BRAS. After step S460, the process proceeds to step S470 in which the actual BRAS is set to the Potential BRAS (in the present embodiment—see the discussion in relation to step S40 of FIG. 3 above as they apply equally to the present step).

Upon completion of step S70 the process proceeds to step S480 in which it is checked to see if any more lines require checking. If so the process returns to step S410. Once all of the lines being monitored by the management device have been checked to see if an upgrade is due, the process ends (following a negative determination at step S480).

FIG. 5 illustrates the steps performed by a sub-process to detect lines which are considered to be swinging (i.e. fluctuating between very different line rate sync speeds over fairly short term timescales). The process is performed every time the BRAS profile for a line is changed (in the present embodiment this is considered to be whenever an instruction is sent to the BRAS to change the BRAS profile for the line—however, in an alternative embodiment discussed below, this process could be run every time a notification is received from the BRAS that a change of profile for the line in question has been made).

The process begins at step S510 in which it is determined if the line in question already has its swinger flag set to TRUE, if so the process ends (since the process must have already previously identified the line as a swinger during an earlier change), otherwise, the process proceeds to step S520.

At step S520 it is determined if the swinger date/time is within a predetermined period which, in the present embodiment, is set to the past 24 hours. If it is not (i.e. because it is set for some time earlier than 24 hours ago, or because the swinger date/time is set to Null—e.g. because it has not yet been set) then the process proceeds to step S530 in which the swinger date time is set to the current date/time and the swinger counter parameter is set to 1 and then the process ends.

If at step S520 it is determined that the swinger date/time is set to a time within the past 24 hours (in the present embodiment) then the process proceeds to step S540 in which the swinger counter is examined to see if it exceeds a swinger counter threshold which, in the present embodiment is set to 3. If the threshold is not exceeded, then the process proceeds to step S550 in which the swinger counter is incremented and then the process ends, otherwise, if the threshold is exceeded, then the line is determined as being a swinger and consequently the process proceeds to step S560 in which the swinger flag is set to TRUE and then the process ends.

Variations

As an enhancement to the above described embodiment, the system could additionally include a Graphical User Interface (GIU) function by which administrators and operators of the system may view at least some of the various parameters stored in the management device 100 and manually change some of these variables for a particular line as identified by some suitable line identifier such as the PSTN telephone number associated with the line. Such a function preferably allows the operator/administrator to view at least the current BRAS profile (name and headline rate), the current line rate the Bin and Bin Upgrade date/Time and the Swinger Flag status. Preferably the operator administrator is able to change the BRAS profile manually by selecting between a number of different possibilities presented by the GUI and upon doing so the system will also reset the new line flag status to TRUE and send a sync event message to the management device immediately, thus causing the BRAS profile to be immediately updated to the profile associated with the line rate sent by the GUI in accordance with the selection made by the operator/administrator.

As a further enhancement to the present embodiment discussed a little above, a separate function can be employed for controlling and monitoring instructions sent to the BRAS (or BRAS's where there is more than one). Such a function is preferably performed by the management device (running autonomously, perhaps in a separate thread or on a separate processor, etc. to the main processes described above) and receives all instructions generated by the main function (i.e. the processes of FIGS. 3 and 4) and queues any instructions for a particular line while there is an outstanding instruction for that line for which no confirmation of successful completion has been received. If multiple requests are generated while there is an outstanding request, then only the most recent is held in the queue as that is the only relevant one.

If an outstanding request returns with a successful message and there is another queued request, then the queued request is sent immediately.

If the outstanding request returns with a failure message or times out and there is no queued request then the failed request is retried up to, for example, 3 times. If it fails or times out all 3 times an exception is raised to initiate investigation into the failures.

If the outstanding request returns with a failure message or times out and there is a queued request, the queued request is sent rather than retrying the original request.

The invention claimed is:

1. A method of provisioning an interface device, the interface device interfacing between an access network and a back-bone network, the access network including a Digital Subscriber Line, DSL, connection to an end user terminal and a transceiver device including a DSL transceiver for modulating and demodulating signals sent to and from the end user terminal over the DSL connection, the arrangement of the access network the interface device and the back-bone network being such that data from a device connected to the back-bone network which is destined for the end user terminal passes through the interface device and then through the access network and wherein the interface device is operable to constrain the rate of flow of data from the backbone network through the interface device towards the end user terminal to an existing maximum rate specified for the end user terminal, the method comprising:

providing a management device for managing the interface device;

receiving data readings from the transceiver device indicative of the current or recent line rate of the DSL connection; and provisioning the interface device to restrict data flowing to the DSL connection to a new maximum rate selected by the management device in accordance with the received data readings from the transceiver device indicative of the current or recent line rate of the DSL connection, wherein, when the new maximum rate is greater than the existing maximum rate for the DSL connection at which the interface device is currently provisioned, the interface device is provisioned or re-provisioned only after a delay period, and wherein the delay period depends upon the amount of the increase in the new maximum rate compared to the existing maximum rate, and wherein, the greater the increase in the new maximum rate compared to the existing maximum rate, the shorter the delay period.

2. The method according to claim 1 in which, in order to determine if the delay period has expired the following steps are performed: a delay start time is determined and added to a delay duration and then this sum is compared with the current time and if the sum is found to be less than the current time then the delay period is determined to have expired, wherein the delay duration is determined based on the amount of the increase in the new maximum rate and wherein the delay start time comprises either the time of receipt of a data reading indicating that the line rate of the DSL connection has increased sufficiently to justify a re-provisioning of the interface device, or the time at which the interface was last provisioned or re-provisioned in respect of the DSL connection.

3. The method according to claim 1, wherein, if the new maximum rate for which the interface device is to be provisioned is less than the currently provisioned rate, then the interface device is re-provisioned as soon as possible, regardless of the size of the change.

4. The method according to claim 1 wherein the transceiver device is a digital subscriber line access multiplexer and the interface device is a broadband remote access server.

5. The method according to claim 1 further comprising: determining if the delay period has expired, said determining comprising:

determining a delay start time;

adding the delay start time to a delay duration to compute a sum;

comparing the sum with the current time; and determining that the delay period has expired if the sum is less than the current time.

6. The method according to claim 5 wherein:

the delay duration is determined based on the amount of the increase in the new maximum rate; and the delay start time comprises either: (i) the time of receipt of a data reading indicating that the line rate of the DSL connection has increased sufficiently to justify a re-provisioning of the interface device, or (ii) the time at which the interface was last provisioned or re-provisioned in respect of the DSL connection.

7. A management device for assisting the making of a broadband data connection to an end user terminal having an associated end user DSL modem from an Internet Service Provider, ISP, having a Point Of Presence, POP, on a backbone network, the data connection extending from the ISP POP across the backbone network to an interface device between the backbone network and an access network to which the end user terminal is connected, the access network including a Digital Subscriber Line Access Multiplexer, DSLAM, and a local loop extending between the DSLAM and the end user DSL modem, the management device including:
- a DSLAM interface for receiving messages from the DSLAM indicating the rate of the DSL connection established between the end user DSL modem and the DSLAM and an interface device interface for transmitting control messages to the interface device,
- a data store for storing data in respect of the broadband data connection, and
- a processor unit for processing messages received from the DSLAM in combination with data stored in the data store to generate control messages for sending to the interface device,
- wherein when a message received from the DSLAM indicates that a new control message should be sent to the interface device in order to re-provision the interface device to allow data through it at a new increased maximum rate corresponding to a new increased DSL connection data rate indicated in the message, the processor unit determines a delay period which depends upon the amount of the increase of the new maximum rate compared to the existing maximum rate for the connection at which the BRAS is currently provisioned,
- wherein the greater the increase of the new maximum rate compared to the existing maximum rate for the connection at which the BRAS is currently provisioned, the shorter the delay period, and
- wherein, upon or after expiry of this delay period, the management device is further operable to generate and send a control message to the interface device based on the information contained in the most recently received message from the DSLAM concerning the DSL connection.

8. The management device according to claim 7, wherein the processing unit is configured to determine if the delay period has expired by at least being configured to:
- determine a delay start time;
- add the delay start time to a delay duration to compute a sum;
- compare the sum with the current time; and
- determine that the delay period has expired if the sum is less than the current time.

9. The management device according to claim 8 wherein:
- the delay duration is determined based on the amount of the increase in the new maximum rate; and
- the delay start time comprises either: (i) the time of receipt of a data reading indicating that the line rate of the DSL connection has increased sufficiently to justify a re-provisioning of the interface device, or (ii) the time at which the interface was last provisioned or re-provisioned in respect of the DSL connection.

10. A non-transitory computer-readable medium carrying a program or programs for causing a computer, upon execution of the program or programs, to perform the method of claim 1.

11. A management device for managing an interface device which provides an interface between (i) an access network having a DSL connection and a transceiver device and (ii) an IP network, the management device comprising:
- an input configured to receive data from a transceiver device, the received data being indicative of the current or recent line rate of the DSL connection; and
- a processing unit configured to control the interface device so as to restrict data flowing from the IP network to the DSL connection of the access network to a new maximum rate determined by the management device in accordance with the data received from the transceiver device indicative of the current or recent line rate of the DSL connection;
- wherein, when the new maximum rate is greater than an existing maximum rate for the DSL connection at which the interface device is currently provided, the interface device restricts the data flowing to the DSL connection to the new maximum rate only after a delay period, and
- wherein the delay period depends upon the amount of the increase in the new maximum rate compared to the existing maximum rate so that the greater the increase in the new maximum rate compared to the existing maximum rate, the shorter the delay period.

12. The management device according to claim 11, wherein the processing unit is configured to determine if the delay period has expired by at least being configured to:
- determine a delay start time;
- add the delay start time to a delay duration to compute a sum;
- compare the sum with the current time; and
- determine that the delay period has expired if the sum is less than the current time.

13. The management device according to claim 12 wherein:
- the delay duration is determined based on the amount of the increase in the new maximum rate; and
- the delay start time comprises either: (i) the time of receipt of a data reading indicating that the line rate of the DSL connection has increased sufficiently to justify a re-provisioning of the interface device, or (ii) the time at which the interface was last provisioned or re-provisioned in respect of the DSL connection.

14. The management device according to claim 11, wherein, if the new maximum rate is less than the currently provided rate, then the interface device is re-provisioned as soon as possible, regardless of the size of the change.

15. The management device according to claim 11, wherein the transceiver device is a digital subscriber line access multiplexer and the interface device is a broadband remote access server.

* * * * *